United States Patent [19]

Piazza

[11] 4,364,298
[45] Dec. 21, 1982

[54] STRINGED SIMULATOR

[76] Inventor: Gary L. Piazza, 2156 Medfield Trail, NE., Atlanta, Ga. 30345

[21] Appl. No.: 295,832

[22] Filed: Aug. 24, 1981

[51] Int. Cl.³ .............................................. G09B 15/06
[52] U.S. Cl. .................................... 84/465; 84/485 R
[58] Field of Search ................ 84/267, 291, 453, 465, 84/485 R

[56] References Cited

U.S. PATENT DOCUMENTS

| | | | |
|---|---|---|---|
| 1,841,398 | 1/1932 | Bergh | 84/465 |
| 3,218,904 | 11/1965 | Hartman | 84/485 R |
| 3,413,883 | 12/1968 | Helbourne | 84/267 |
| 4,031,801 | 6/1977 | Cecchini | 84/465 |
| 4,232,582 | 11/1980 | Diamond | 84/267 |
| 4,235,143 | 11/1980 | Hoexter | 84/1.16 |

Primary Examiner—Lawrence R. Franklin
Attorney, Agent, or Firm—W. Thad Adams, III

[57] ABSTRACT

A stringed simulator 10 is provided which is portable, compact and produces low sound levels. The simulator 10 enables a player to practice both right and left hand fingering which closely simulates practice on a corresponding full-size instrument. The simulator includes a non-acoustic body 11 having peripheral dimensions substantially smaller than a corresponding full-size instrument. An elongate neck 12 is carried by the body 11 and is substantially shorter in length than, but the same width, thickness and contour as, the neck of a corresponding full-size instrument. A plurality of frets 16 positioned on the top surface of neck 12 are correspondingly proportional to fret intervals on a full-size instrument.

10 Claims, 9 Drawing Figures

STRINGED SIMULATOR

TECHNICAL FIELD AND BACKGROUND OF THE INVENTION

This invention relates to a stringed simulator which is intended to enable a player to practice both right hand plucking and left hand fingering which closely simulates practice on a corresponding full-size stringed instrument, such as a classical guitar.

There are many previous inventions for practicing stringed instruments. For example, U.S. Pat. No. 4,112,084 (Cecchini) discloses an apertured sound chamber having strings stretched over the aperture for right hand fingering. A fingerboard is accommodated between the sound chamber and the strings, as well as a removable fret board which can be placed between the sound chamber and strings for left hand fingering.

U.S. Pat. No. 4,031,801 (Cecchini) discloses an elongate member having frets on one side with an apertured sounding box on the other which can be used for plucking or strumming.

U.S. Pat. No. 3,218,904 (Hartman) discloses a guitar neck wherein the strings and frets of a guitar are simulated by permanent ridges which contain color coded identification for several particular chords. This device is intended for beginning students and for left hand technique only.

U.S. Pat. No. 3,494,240 (Laselva, et al.) discloses a hollow box with a bridge and one or more elastic bands mounted on the box with portions stretched over the bridge to illustrate the physics involved in the production of sound and tonal quality.

While all of these devices permit the creation of music in some fashion, none of the known prior art devices enable the serious player to replicate or simulate the precise techniques a serious player must master. Specifically, the prior art does not disclose an instrument which offers simultaneous right and left hand practice. There is no disclosure of training devices having shapes and designs which duplicate the exact dimensions of a full-size instrument in neck width, string spacing, contour, and feel. These devices also fail to simulate the exact size, contour, and feel of a standard full-size guitar neck and do not provide a place for resting the left hand thumb when chording or practicing left hand finger reach.

SUMMARY OF THE INVENTION

Therefore, it is an object of the invention to provide a stringed simulator of a small size which is portable and easy to use in vehicles and other locations where a full-size instrument would be impractical.

It is another object of the present invention to provide a stringed simulator which is portable, compact and produces a low sound level so the player can practice both right hand plucking and left hand fingering which closely simulates practice on a corresponding full-size stringed instrument.

It is yet another object of the present invention to provide a stringed simulator which permits the player to practice technical exercises with both right and left hands simultaneously or separately.

These and other objects and advantages of the present invention are achieved in a preferred embodiment of the stringed simulator by providing a non-acoustic body having peripheral dimensions substantially smaller than a corresponding full-size instrument, such as a classical guitar. An elongate neck is carried by and projects laterally outwardly from one side of the body, the neck being substantially shorter in length than that of a corresponding full-size instrument. While shorter, the neck has the same width, thickness and contour as that on a corresponding full-size instrument.

A plurality of strings are tensioned between a conventional head adjacent the free end of the neck and a bridge adjacent the periphery of the body remote from the neck. A plurality of frets are positioned on and spaced along the top surface of the neck at intervals from each other and correspond proportionally to fret intervals on a full-size instrument.

The stringed simulator is preferably comprised of a solid, one-piece structure, one side edge of which defines an arcuate cut-out to facilitate resting the body of the simulator on the user's thigh in the same manner as a conventional guitar.

According to one preferred embodiment of the invention, four frets having interval spacing corresponding in a one-to-one proportion to the first four frets inwardly from the nut on a corresponding full-size instrument are positioned along the neck.

In another preferred embodiment of the invention, twelve frets having interval spacing corresponding in a one-to-one proportion to the fifth through eighteenth frets inwardly from the nut on a corresponding full-size instrument are positioned on the neck.

As will be explained in further detail below, the stringed simulator can be manufactured in such a way as to closely simulate practice on a wide variety of full-size stringed instruments. For illustrative purposes only, the simulator according to the present invention is compared to a full-size classical guitar.

BRIEF DESCRIPTION OF THE DRAWINGS

Some of the objects of the invention have been set forth above. Other objects and advantages of the invention will appear as the description of the invention proceeds, when taken in conjunction with the following drawings, in which.

DESCRIPTION OF THE PREFERRED EMBODIMENT

Figure 1:
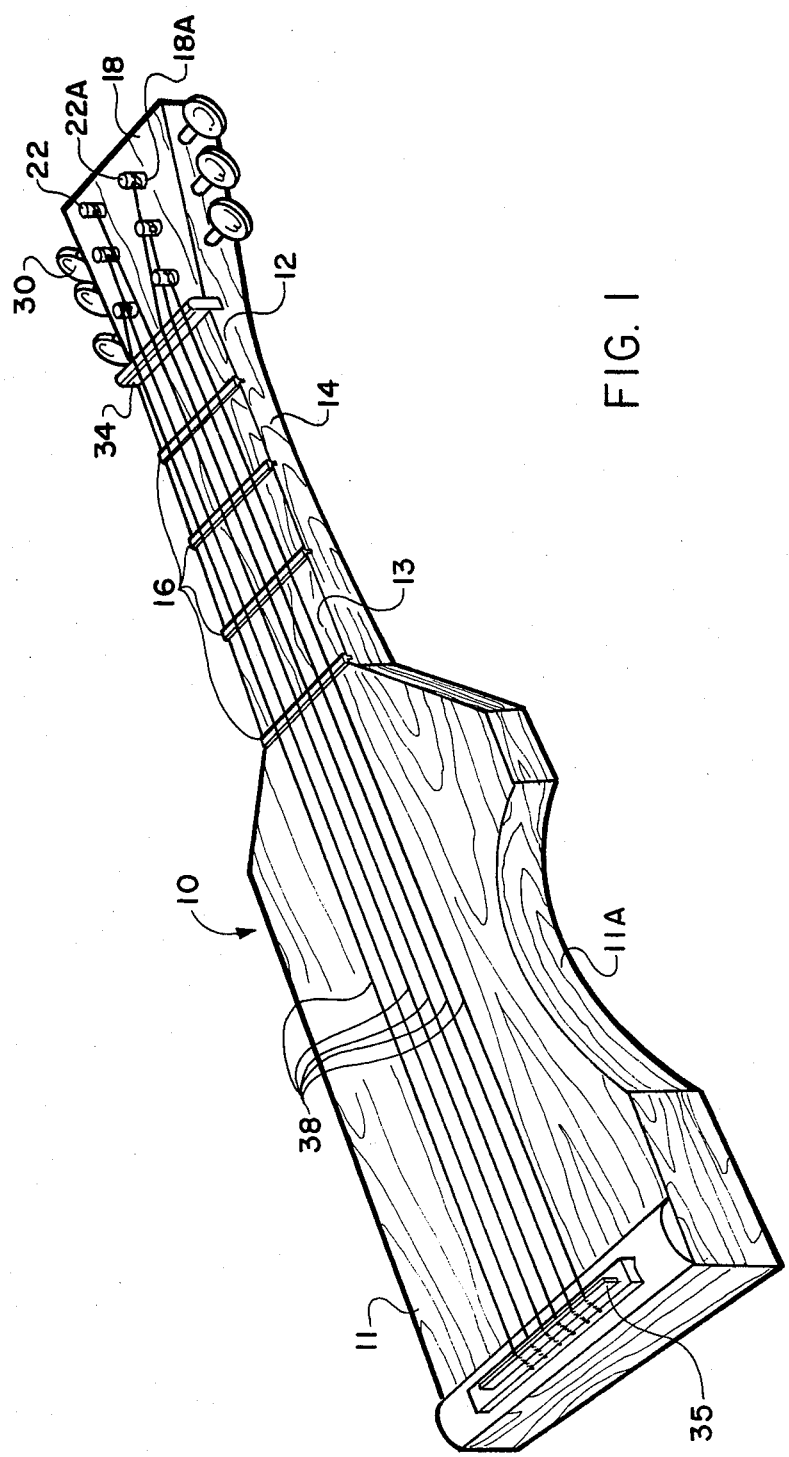
FIG. 1 is a perspective view of a stringed simulator according to one of the preferred embodiments set forth below.

Referring now specifically to the drawings, a stringed simulator according to one embodiment of the invention is shown in FIG. 1 at broad reference numeral 10. The simulator 10 comprises a body 11 which is preferably solid and constructed of a suitable hardwood. As is also shown in FIG. 1, body 11 is non-acoustic in the sense that no sound box or other amplifying means are provided. This is done in order to provide a simulator which produces low sound levels enabling a player to practice in a wide variety of places where a full-size acoustic instrument would be unsuitable. As is also shown in FIG. 1, one longitudinally extending side edge of the body 11 is formed to provide an arcuate cut-out 11a which, when played by a right handed player, permits the simulator 10 to be comfortably rested on the player's thigh. The body 11 is approximately 9 inches (23 cm.) long.

Figure 2:
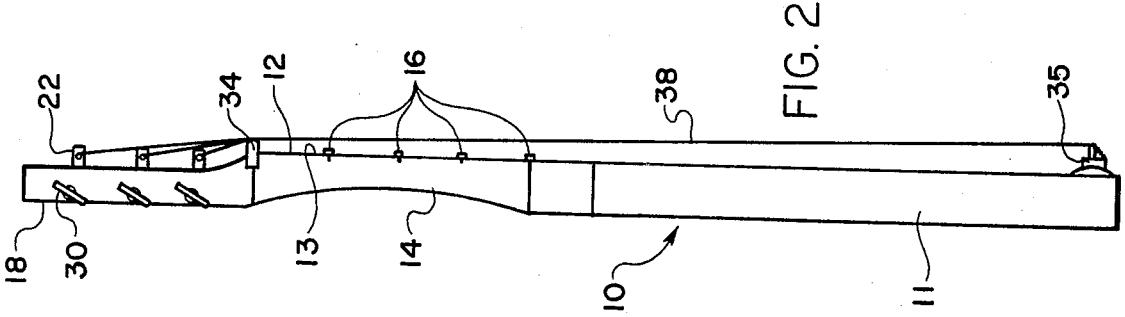
FIG. 2 is a side view of the simulator shown in FIG. 1.
Figure 8:
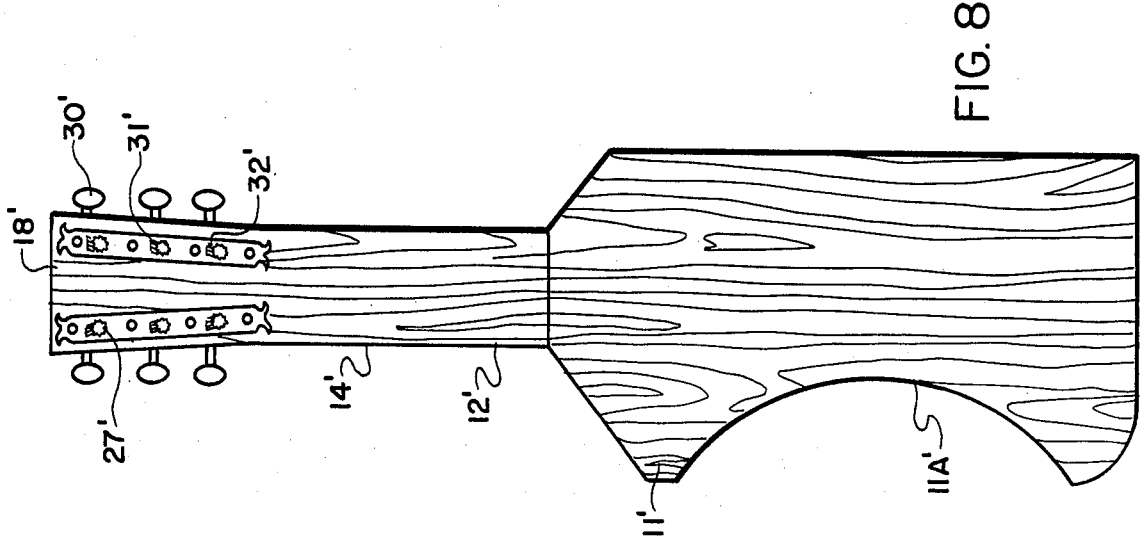
FIGS. 5, 6, 7 and 8 are plan, perspective, side and back views, respectively, of a simulator according to another embodiment of the invention.

An elongate neck 12 is carried by and projects laterally outwardly from one side of body 11. While neck 12 is preferably integrally formed from the same hardwood as the body 11, it can also be formed separately and connected to the body 11 by means of a tongue and groove or some similar structure. Neck 12 comprises a top surface 13 which is flat and duplicates in every respect the width of a neck on a corresponding full-size instrument. Neck 12 also includes an arcuate back 14 which is shown in FIGS. 1 and 2 and is exactly the same width, thickness and contour as the back of the neck in a corresponding full-size instrument.

Figure 3:
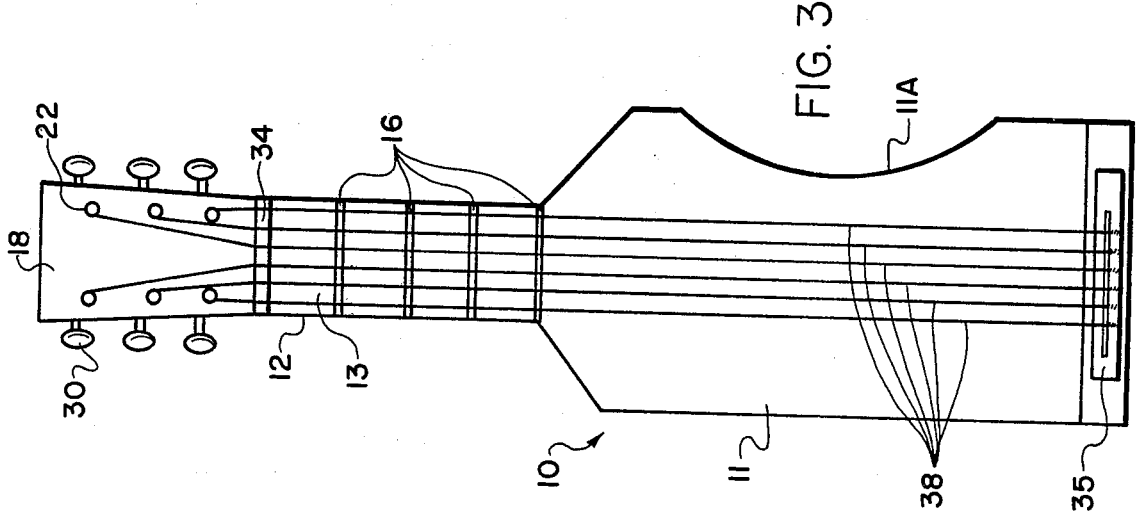
FIG. 3 is a plan view of the top side of the simulator shown in FIG. 1.

As can be seen in FIGS. 1 and 3, neck 12 is provided with four transversely extending and longitudinally spaced-apart frets 16. In accordance with one embodiment of the invention, the spacing of the four frets 16 corresponds in a one-to-one proportion to the first four frets of a full-size classical guitar.

Figure 4:
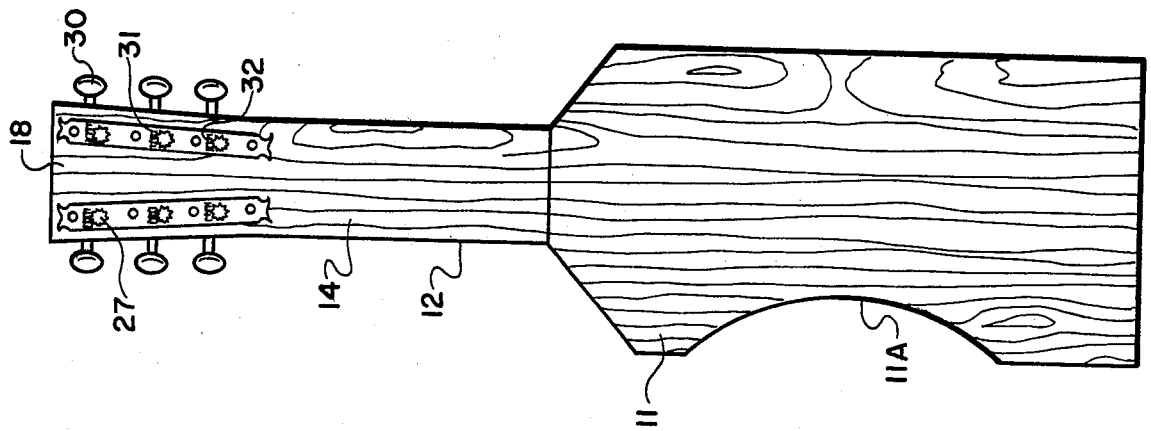
FIG. 4 is a plan view of the bottom side of the simulator, opposite that shown in FIG. 3.

A head 18 is carried by the free end of the neck 12 and is provided with six through holes 18a. Since all parts of the six separate tuning mechanisms correspond exactly, only one of each such part will be numbered, in the interest of clarity. A machine tuning gear post 22 is positioned in each of the six holes. As is shown in FIG. 4, a toothed gear wheel 27 is keyed onto each gear post 22 for rotation therewith. The instrument is tuned manually by turning key 30 which is connected to a worm shaft 31. Worm shaft 31 is rotatably held to the back of the head 18 by means of brackets 32. Worm shaft 31 mates with gear wheel 27 and translates turning motion of key 30 into turning motion of gear post 22.

A raised and notched cross piece, comprising a "nut" 34 is mounted in a laterally extending groove at the juncture of the neck 12 and the head 18. Nut 34 spaces each string 38 away from the top surface 13 of neck 12 and from each other.

Positioned on the top surface of the simulator body 11 on the end remote from the neck 12 is a raised bridge 35. The strings are tensioned between the nut 34 and the bridge 35 and are thereby spaced away from the front of the body 11, the flat surface of the neck 13 and from each other.

Referring again to FIG. 1, six strings 38 are shown, each string 38 being fixed at the bridge 35, extending along the length of the body 11, the neck 12, and being mounted in laterally extending guideholes 22a in each of the gear posts 22. Appropriate tension is maintained on each string 38 by rotating key 30 until the desired pitch is obtained.

The structure of the simulator 10, described above, enables the user to practice both right hand plucking and left hand fingering in a manner which closely simulates practice on a corresponding full-size stringed instrument. The placement of only four frets 16 on the top surface 13 of the neck 12 enables the neck 12 to be greatly shortened, making the simulator 10 far more compact than would otherwise be the case. The length of the neck 12 is approximately 4⅜ inches (11 cm.), compared to a length of 18¼ inches (46 cm.) on a full-size classical guitar.

Figure 5:
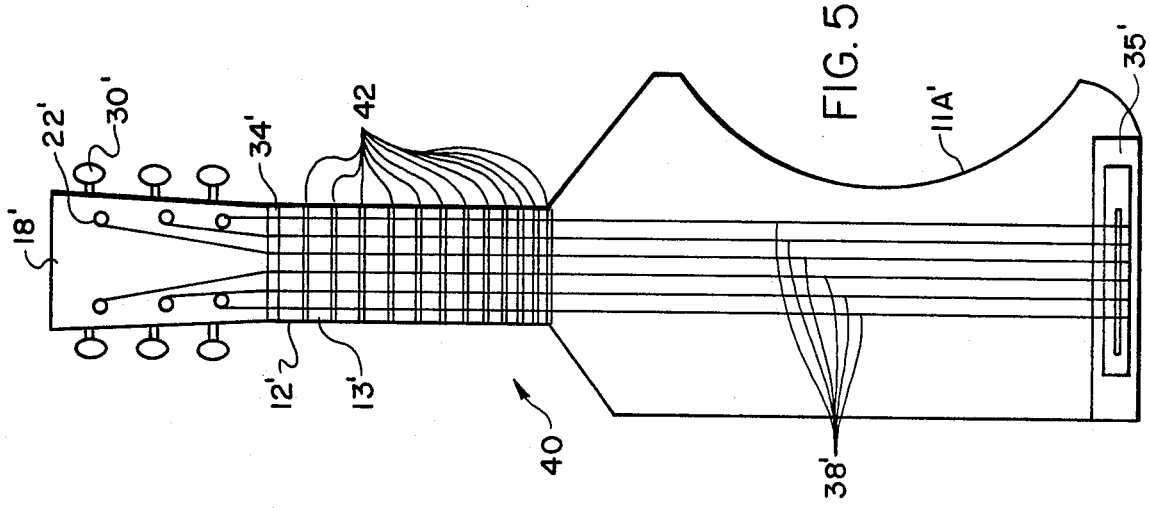
Figure 7:
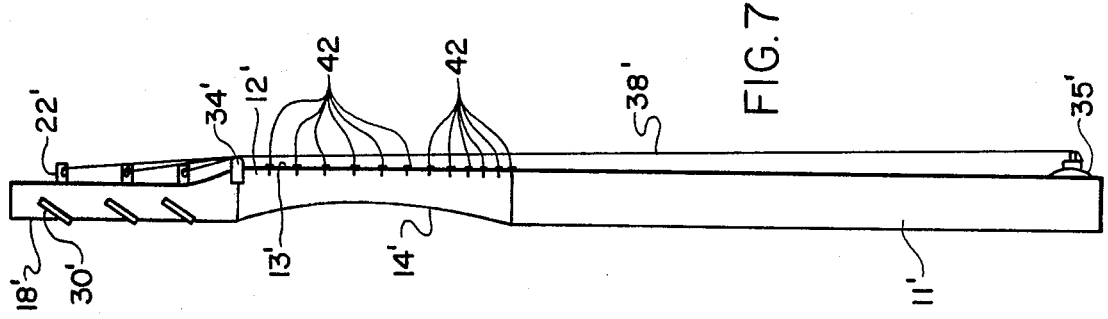

Another embodiment of the present invention is shown in FIG. 5 at broad reference numeral 40. Elements in common with the embodiment shown in FIGS. 1 through 4 and FIG. 6 are shown in prime reference numerals. In order to give the user a greater range of practice, a neck 41 is substituted for the shorter neck 12 shown in FIG. 1, Neck 41 is approximately 10½ inches (27 cm.) long. Likewise, the width, thickness and contour of neck 41 are the same as on a corresponding full-size classical guitar. Twelve frets 42 are spaced apart along the top surface of neck 41. In order to permit as many frets as practical on the neck 41 in as short a length as possible, the twelve frets 42 are scaled from the fifth fret to the sixteenth fret of a standard classical guitar neck. This is because, as shown in FIG. 5, the interval between each fret becomes progressively smaller towards body 11' of the instrument.

Figure 6:
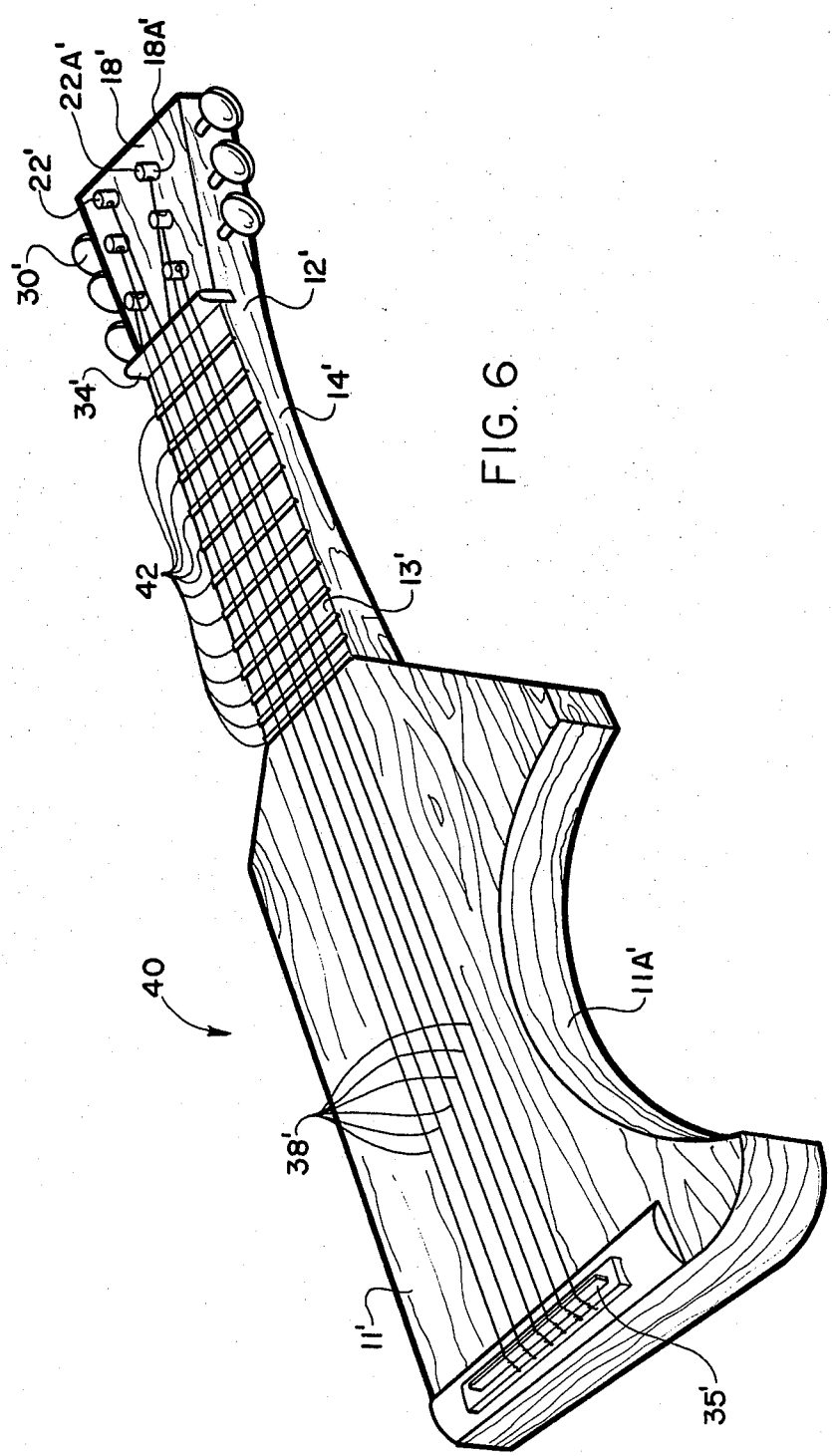
Figure 9:
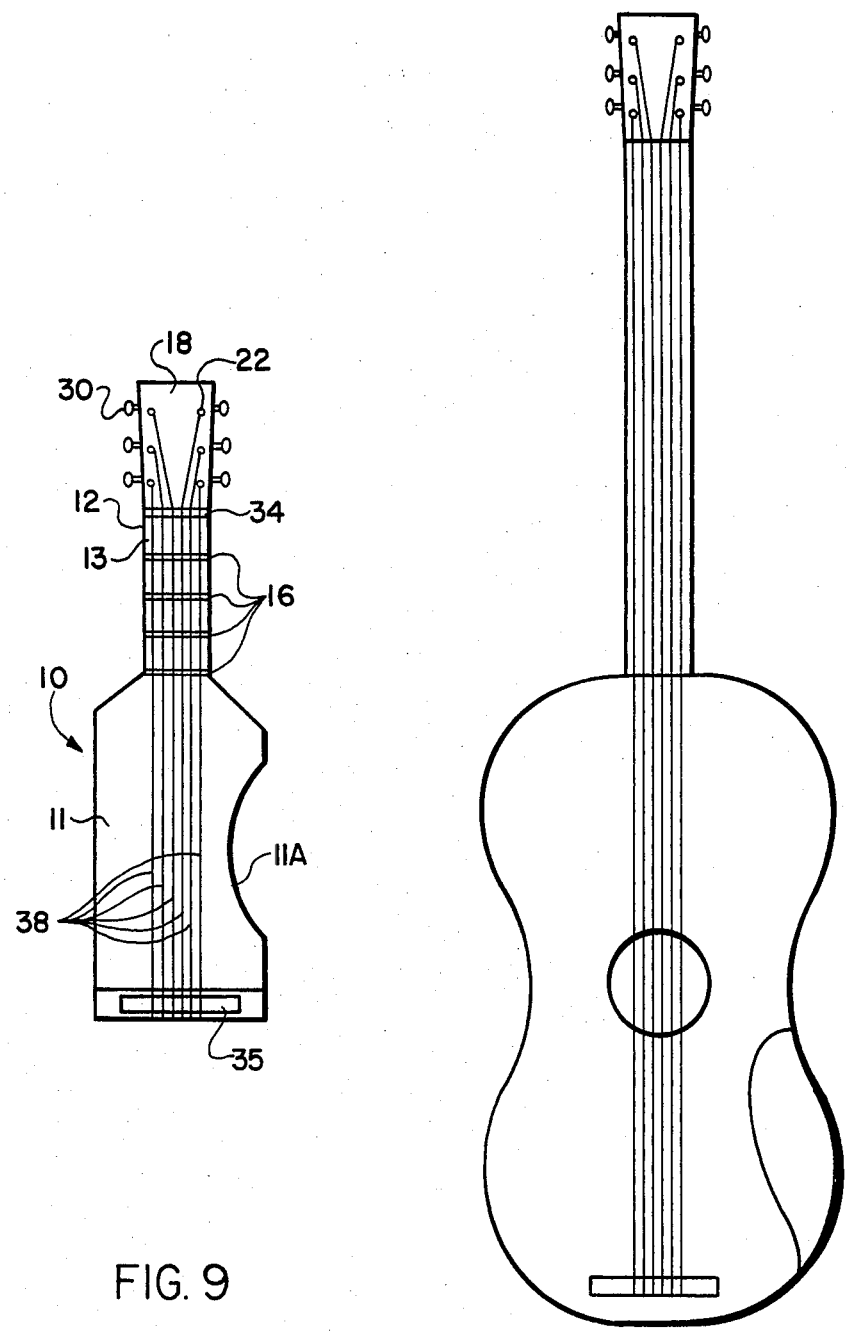
FIG. 9 is a plan view of the top side of the embodiment of the simulator in FIG. 3, shown in comparison with a standard, full-size classical guitar.

As shown in FIG. 6, the size of the simulator 10 in comparison with a full-size classical guitar permits it to be used in a variety of situations and circumstances where the use of the full-size guitar would be impractical. Nevertheless, a full range of skills, including plucking, rasqueado, arpeggios, finger stretching, scales, fingering of chords and strumming may be performed in a way which closely simulates the performance of these techniques on a full-size instrument. While the particular disclosure contained herein relates to a simulator for a classical guitar, simulators embodying the structure and design of the invention can be manufactured corresponding to many different types of guitars, as well as the ukelele, lute and vihuela.

A stringed simulator is described above. Various details of the invention may be changed without departing from the scope. Furthermore, the foregoing description of preferred embodiments of the simulator according to the present invention is provided for the purpose of illustration only and not for the purpose of limitation—the invention being defined by the claims.

I claim:

1. A stringed simulator which is portable, compact and produces low sound levels for enabling a player to practice both right hand plucking and left hand fingering which closely simulates practice on a corresponding full-size stringed instrument, said stringed simulator comprising:
    (a) a non-acoustic body having peripheral dimensions substantially smaller than a corresponding full-size instrument;
    (b) an elongate neck carried by and projecting laterally outwardly from one side of said body said neck having a flat top surface and being substantially shorter in length than, but having the same width, thickness and contour as the neck of a corresponding full-size instrument;
    (c) means positioned adjacent the free end of said neck and adjacent the periphery of said body remote from said neck for tensioning a plurality of strings therebetween; and
    (d) a plurality of frets corresponding to a portion of the fretboard of said full size instrument, said frets being positioned on and spaced along the top surface of said neck at intervals from each other corresponding to the fret intervals of said portion.

2. A stringed simulator according to claim 1, wherein said non-acoustic body is comprised of a solid, one-piece structure.

3. A stringed simulator according to claim 1, wherein said plurality of frets comprises four frets having interval spacing corresponding in a one-to-one proportion to the first four frets inwardly from the nut of a corresponding full-size instrument.

4. A stringed simulator according to claim 1, wherein one side edge of said body defines an arcuate cut-out to facilitate resting said body while in use on the player's thigh.

5. A stringed simulator according to claim 1, wherein said non-acoustic body and elongate neck comprise an integrally formed, one-piece unit.

6. A stringed simulator according to claim 1, wherein said plurality of frets comprises twelve frets having interval spacing corresponding in a one-to-one proportion to the fifth through sixteenth frets, inclusive, inwardly from the nut of a corresponding full-size instrument.

7. A stringed simulator which is portable, compact and produces low volume sound levels for enabling a player to practice both right hand plucking and left hand fingering which closely simulates practice on a corresponding full-size stringed instrument, said stringed simulator comprising:

(a) a solid, non-acoustic body having peripheral dimensions substantially smaller than the body of a corresponding full-size instrument;

(b) an elongate neck integrally formed with and projecting laterally outwardly from one side of said body, said neck having a flat top surface and being substantially shorter in length than, but having the same width, thickness and contour as the neck of a corresponding full-size instrument;

(c) means positioned adjacent the free end of said neck and adjacent the periphery of said body remote from said neck for tensioning a plurality of strings therebetween; and (d) a plurality of frets corresponding to a portion of the fretboard of said full size instrument, said frets being positioned on and spaced along the top surface of said neck at intervals from each other corresponding to the fret intervals of said portion.

8. A stringed simulator according to claim 7, wherein one side edge of said body defines an arcuate cut-out to facilitate resting said body while in use on the player's thigh.

9. A stringed simulator according to claim 7, wherein said plurality of frets comprises four frets having integral spacing corresponding in a one-to-one proportion to the first four frets inwardly from the nut of a corresponding full-size instrument.

10. A stringed simulator according to claim 7, wherein said plurality of frets comprises twelve frets having integral spacing corresponding in a one-to-one proportion to the fifth through sixteenth frets, inclusive, inwardly from the nut of a corresponding full-size instrument.

* * * * *